US012595897B1

(12) United States Patent
Rashidi Doust

(10) Patent No.: US 12,595,897 B1
(45) Date of Patent: Apr. 7, 2026

(54) DOWNLIGHT

(71) Applicant: ELITE LIGHTING, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 19/177,078

(22) Filed: Apr. 11, 2025

(51) Int. Cl.

| | |
|---|---|
| ***F21V 17/12*** | (2006.01) |
| ***F21S 8/02*** | (2006.01) |
| ***F21V 29/76*** | (2015.01) |
| ***F21V 29/89*** | (2015.01) |
| ***F21Y 115/10*** | (2016.01) |

(52) U.S. Cl.
CPC .............. *F21V 17/12* (2013.01); *F21S 8/026* (2013.01); *F21V 29/763* (2015.01); *F21V 29/89* (2015.01); *F21Y 2115/10* (2016.08)

(58) Field of Classification Search
CPC ........ F21V 17/12; F21V 29/763; F21V 29/89; F21S 8/026
See application file for complete search history.

(56) References Cited

U.S. PATENT DOCUMENTS

| | | | | |
|---|---|---|---|---|
| 8,070,328 | B1 * | 12/2011 | Knoble | F21V 3/00 362/345 |
| 8,905,583 | B2 * | 12/2014 | Dubord | F21V 29/507 174/653 |
| 10,125,958 | B1 * | 11/2018 | Wronski | F21V 21/047 |
| 11,060,705 | B1 * | 7/2021 | Danesh | F21V 17/10 |
| 2008/0285271 | A1 * | 11/2008 | Roberge | F21V 29/80 362/373 |
| 2011/0305016 | A1 * | 12/2011 | Maeers | F21V 29/507 362/249.02 |
| 2012/0140490 | A1 * | 6/2012 | Rowlette, Jr. | F21V 29/773 362/373 |
| 2013/0301275 | A1 * | 11/2013 | Kim | F21V 17/12 362/294 |
| 2014/0056026 | A1 * | 2/2014 | Boomgaarden | F21S 8/026 362/609 |
| 2016/0281940 | A1 * | 9/2016 | Kim | F21V 23/002 |

* cited by examiner

*Primary Examiner* — Bryon T Gyllstrom

(74) *Attorney, Agent, or Firm* — Payam Moradian

(57) ABSTRACT

Provided is a Light Fixture comprising: a body with a cavity, the body having an opening on a bottom of the cavity; one or more openings in the body that transverse the body from a bottom of the body to a top of the body; a bracket with one or more openings that are complementary to the one or more openings of the body, the bracket configured to be placed on top of the openings of the body in a manner; one or more fasteners for attaching the body to the bracket, wherein the fastener is configured to be fastened from below the body; wherein the fastener is the only point of attachment of the body to the bracket, resulting in the body falling downwardly with the removal of the fastener.

20 Claims, 10 Drawing Sheets

DOWNLIGHT

BACKGROUND SECTION OF THE INVENTION

Lighting Fixtures with small openings can be hidden in a ceiling, providing a source of light without the body of the light source being visible to a user, such as those disclosed in U.S. Pat. Nos. 12,276,409 and 10,151,461. An issue with these light fixtures is that they need substantial work to remove them from the ceiling. There is a need in the art for a light fixture that addresses this issue.

SUMMARY SECTION OF THE INVENTION

Provided is a light fixture comprising: a) a body with a cavity, the body having an opening on a bottom of the cavity; b) one or more openings in the body that transverse the body from a bottom of the body to a top of the body; c) a bracket with one or more openings that are complementary to the one or more openings of the body, the bracket configured to be placed on top of the openings of the body in a manner; d) one or more fasteners for attaching the body to the bracket, wherein the fastener is configured to be fastened from below the body; wherein the fastener is the only point of attachment of the body to the bracket, resulting in the body falling downwardly with the removal of the fastener. The body has two steps, with each step placed on opposite sides, wherein the maximum height of the steps at any point is less than the maximum height of the entire body. The openings on the body can transverse the steps. The height of the step is 0.3 to 0.7 can be relative to the maximum height of the body. The light fixture can further comprise a groove running parallel between the body and the step. The bracket can have a horizontal portion, and a first vertical portion that forms a channel to receive a T-bar, and a second vertical portion configured to be placed in a groove of the body. The bracket can have a vertical portion configured to be placed inside of the groove. The bracket can have a horizontal portion, and at least one vertical portion that forms a channel to receive a T-bar. The light fixture of can comprise of placing a source of light in the cavity. The light fixture can include a one-piece fabricated plate with a ring attached below the plate, the plate placed on a bottom of the body, the plate and then ring having an opening that creates an aperture for light leaving the body. The plate can be configured to receive a drywall around its ring. The light fixture can comprise a mud ring configured to be placed below the drywall. The light fixture can further comprise a trim. The body can be a heat sink made from aluminum and having a plurality of fins on top.

Provided is a light fixture comprising: a) a body with a cavity having an opening on a bottom of the cavity, the body having a main portion and steps on opposite sides of the main portion; b) one or more openings in the body that transverse the body from a bottom of the steps to a top of the steps; c) two bracket with one or more openings that are complementary to the one or more openings of the steps, the brackets configured to be placed on top of the steps in a manner where both sets of openings align, with one bracket placed on one step; d) one or more fasteners for attaching the body to the bracket, wherein the one or more fasteners is configured to be fastened from below the body; wherein the one or more fasteners is the only point of attachment of the body to the bracket, resulting in the body falling downwardly with the removal of the fastener. The light fixture can further comprise a groove running parallel between the main part of the body and the steps. The bracket can have a horizontal portion, and a first vertical portion that forms a channel to receive a T-bar, and a second vertical portion configured to be placed in a groove of the body. The horizontal portion of the bracket can receive the one or more fasteners. The body can be made from aluminum and has fins on its top, and further comprises a one piece manufactured steel plate with a ring to enclose inside of the body. The brackets can be configured to be attached to bar hangers.

DETAILED DESCRIPTION OF THE INVENTION

The present application provides a Mini LED light fixture that can be removed for repair or replacement without removal of any bar hangers or a larger than needed opening in the ceiling.

Figure 1:
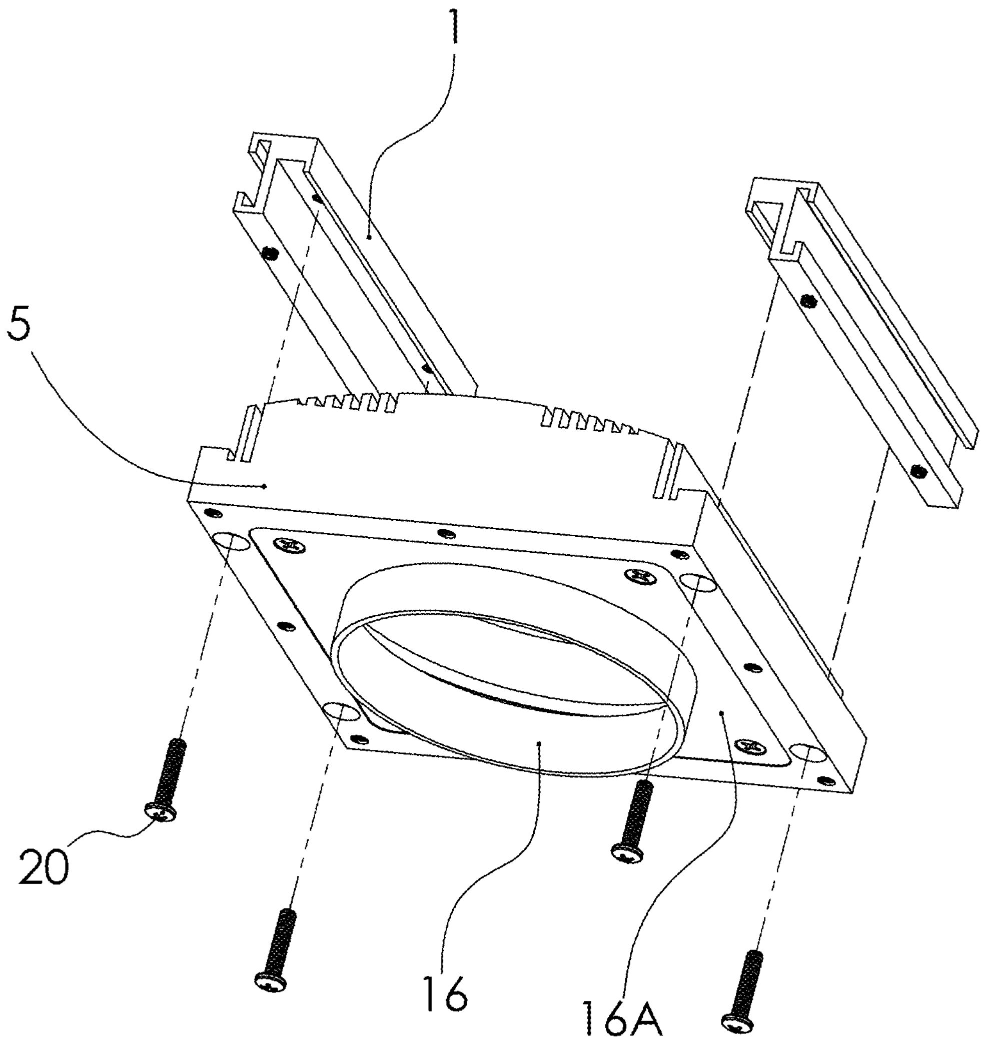
FIG. 1 illustrates an exploded view of the light fixture and the ceiling.

FIG. 1 illustrates heat sink 5 and bar hangers 12 of the light fixture. The heat sink 5 is shown with bottom plate 16A and ring 16. Fastener 20 transverses the step of heat sink 5, in a vertical direction, and attached to bracket 1.

Heat sink 5 is attached to bracket 1 with fastener 20, which is typically in form of a screw. Heat sink 5 can be a cube or a cuboid with a step on opposite sides. Heat sink 5 functions as a housing for the optics 8 and dissipates the heat from its aluminum fins placed on top of heat sink 5. Heat sink 5 has opposite sides with a step on the outside. Heat sink 5 can have a step that creates two horizontal widths, a longer width with the step extending sideways and a shorter higher width at a higher vertical level in absence of the step. The other two opposite sides of the heat sink 5 can have the same height and have identical profiles, and extend upwardly in a vertical direction to cover the steps and the height above the steps.

Heat sink 5 is removably attached to bracket 1 from the bottom with fastener 20. There is a plurality of openings on the step of heat sink 5 that go through the entire height of the step in a vertical direction (transverse the step). The openings on the step can also be made to have an angle (60-90 degrees). The height of the step can be 0.3 to 0.7 at the openings in relation to the highest height of the heat sink 5. The bracket 1 has complementary openings on its horizontal portion. Fastener 20, which is fastened from the bottom of the heat sink 5, transverses the heat sink 5 and attaches to bracket 1, thereby removably attaching heat sink 5 to bracket 1. There can be a groove between the step and the main body of the heat sink 5. Specifically, a groove can run along the step (in parallel) of the main body of the heat sink 5 and the step, the groove having a depth lower than the step (such as 0.1 to 0.3 inches lower depth)

Bracket 1 is configured to rest in the groove between the step and main body of heat sink 5. Bracket 1 can have a horizontal portion and two vertical portions. One vertical portion can go downwardly at a 90-degree angle (in perpendicular fashion) on one side for fitting into the groove. Another vertical portion can have a second vertical portion (in perpendicular fashion) that comes below and is configured to have a channel to receive a bar hanger (T track).

Figure 2:
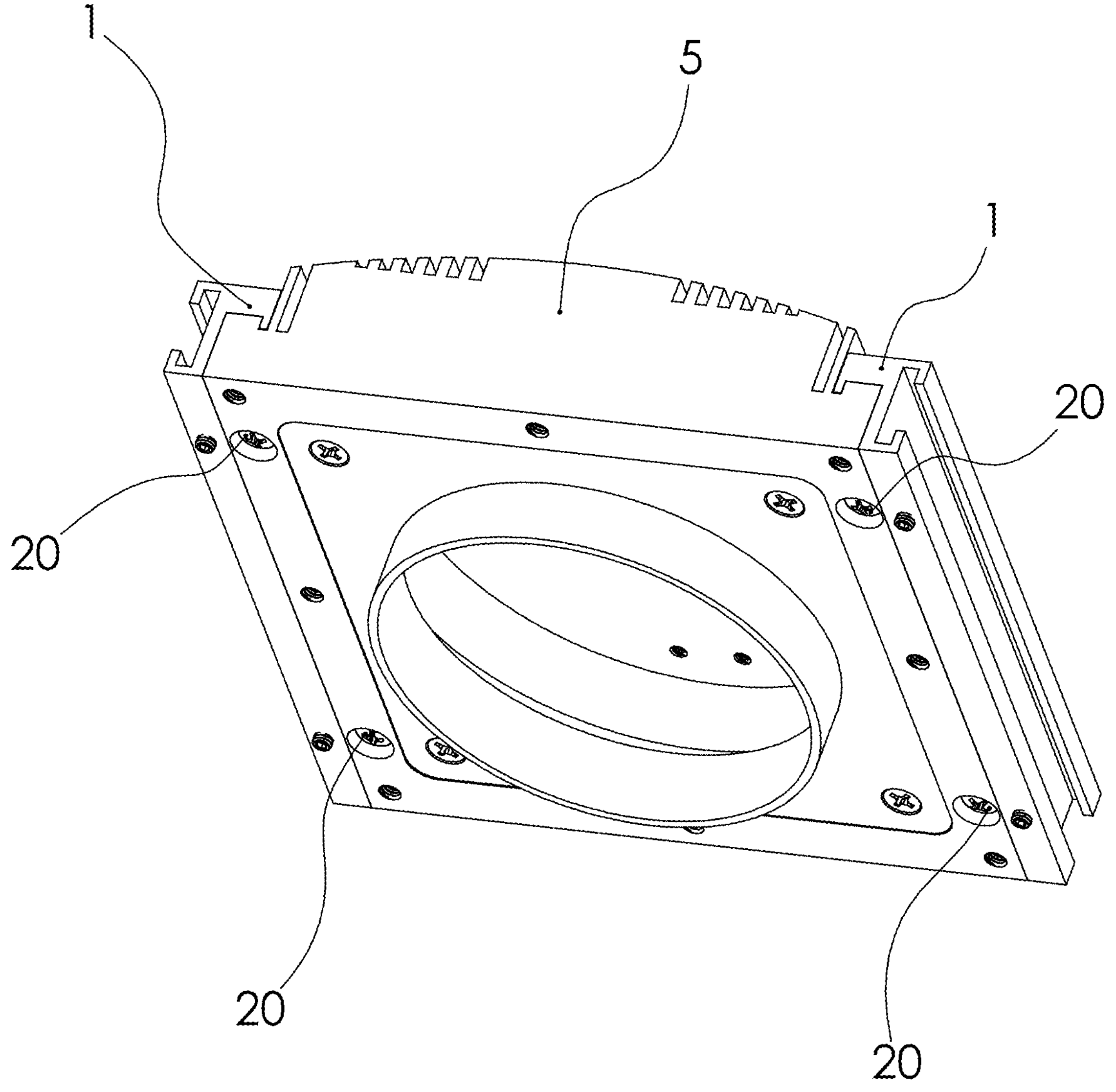
FIG. 2 illustrates a perspective view of the light fixture installed in the ceiling.

FIG. 2 illustrates the attachment of bracket 1 to heat sink 5. The attachment is done with fastener 20 from the bottom. Because the only attachment is with fastener 20 from the bottom, heat sink 5 drops its position after removal of fastener 20. There is no need to open the ceiling further to remove the bar hangers 12 to remove or repair the light fixture.

Heat sink 5 has a plate 16A with an aperture ring 16. Plate 16A can be made from steel and be one piece with ring 16. Optic 8 with LED sources of light is placed inside of heat sink 5 and can be attached to the bottom of the top portion of the heat sink 5. Secondary drywall 6 is placed around ring 16, and hides heat sink 5 from view. Mud ring plate 7, which has a ring on top, is placed below of the secondary dry wall 6. The flat bottom portion of the mud plate ring 7 can cover the secondary drywall 6 and the ring can go inside secondary dry wall 6. Trim 9 can be placed inside of mud ring 7, and can cover the height of the ceiling. Fasteners 13 can be used to attach the components together.

The top of the step of heat sink 5 is attached to bracket 1. Bracket 1 is attached to bar hanger 2. Bar hanger 2 is attached to joist 3 of ceiling tile 4.

Figure 3:
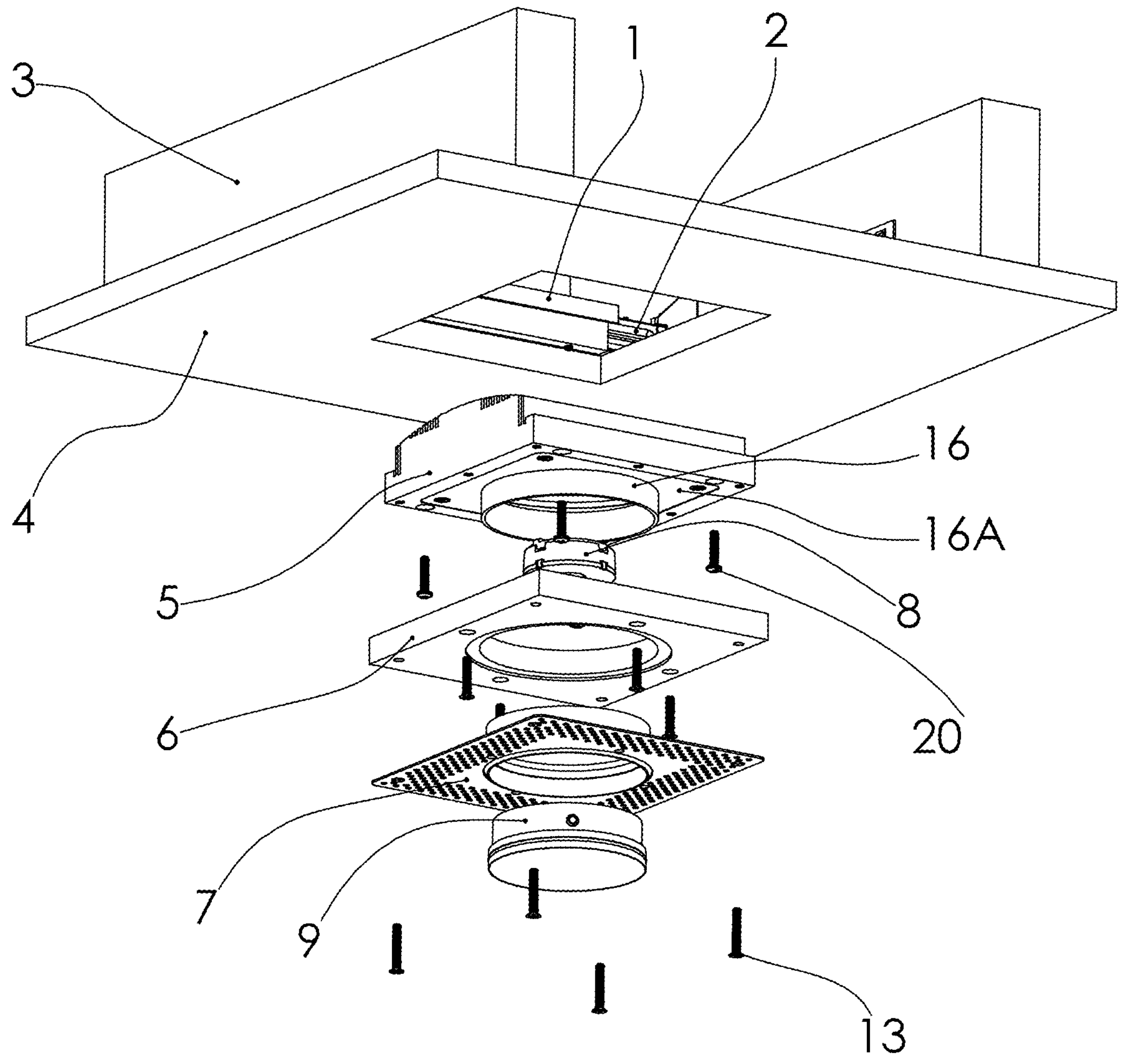
FIG. 3 illustrates a perspective-bottom view of the light fixture installed in the ceiling.

FIG. 3 illustrates an exploded view of the light fixture and the ceiling. Illustrated in this figure are heatsink holder bracket 1, Bar hanger 2, Joist 3, ceiling tile 4, heat sink 5, secondary drywall 6, mud ring plate 7, optic 8, trim 9, Solite Lens 10, Bar hanger nail 11, bar hanger joist bracket 12, flat head screw (fastener) 13, flat head screw (fastener) 20. End of flat head screw (fastener) 20 is visible in the opening 14.

Figure 4:
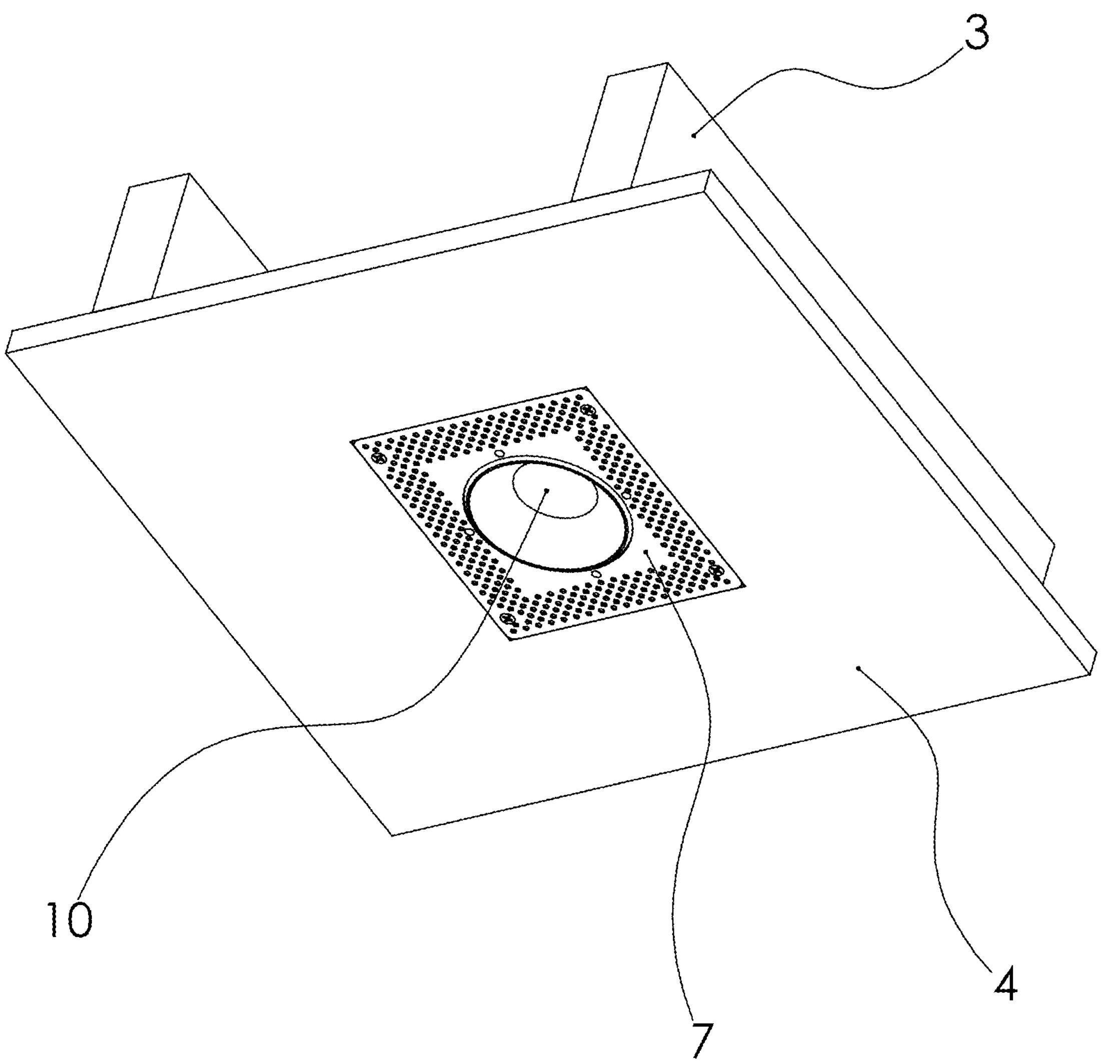
FIG. 4 illustrates a perspective side view of the light fixture installed in the ceiling.
Figure 5:
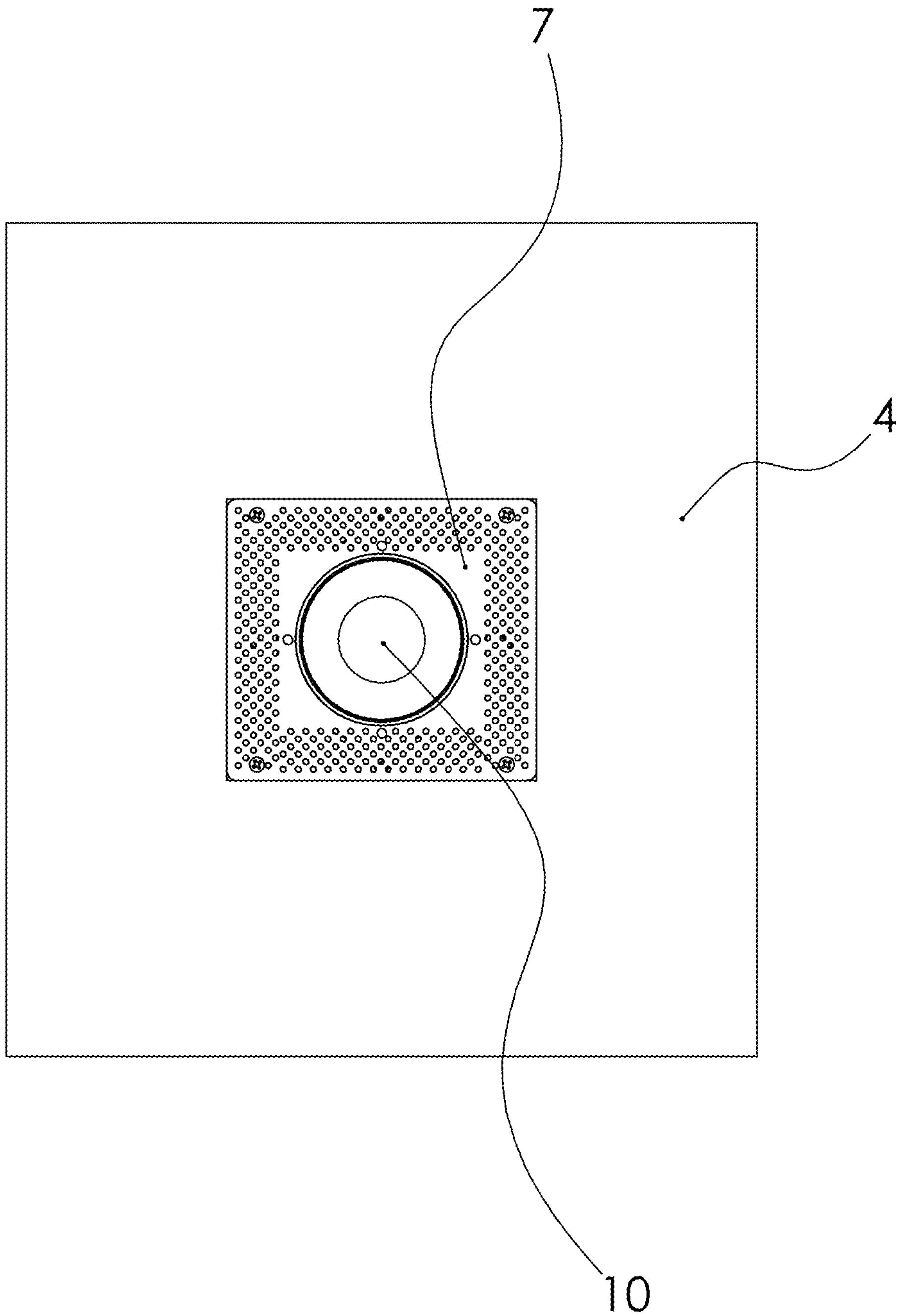
FIG. 5 illustrates a bottom plan view of the light fixture installed in the ceiling.

FIGS. 4 and 5 illustrate the light fixture attached to the ceiling. Illustrated in this view are lens 10, mud ring plate 7, ceiling tile 4, and joist 3. The mud ring 7 is attached to the ceiling tile with fasteners, and keeps lens 10 in place. Mud ring plate 7 is flush with the ceiling tile 4.

Figure 6:
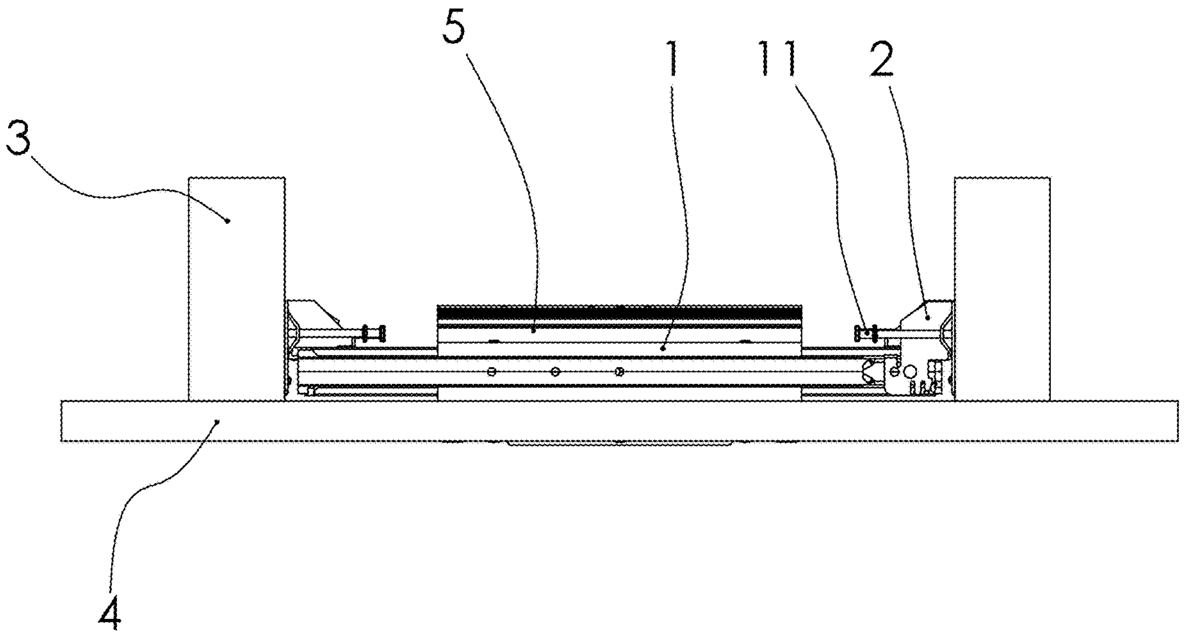
FIG. 6 illustrates a side view of the light fixture installed in the ceiling.

FIG. 6 illustrates a side view of heat sink 5 attached to the bar hanger 2 through track of bracket 1. Illustrated in this view is the heat sink 5, bar hanger 2, and bar hanger nail 11 attached to joist 3.

Figure 7:
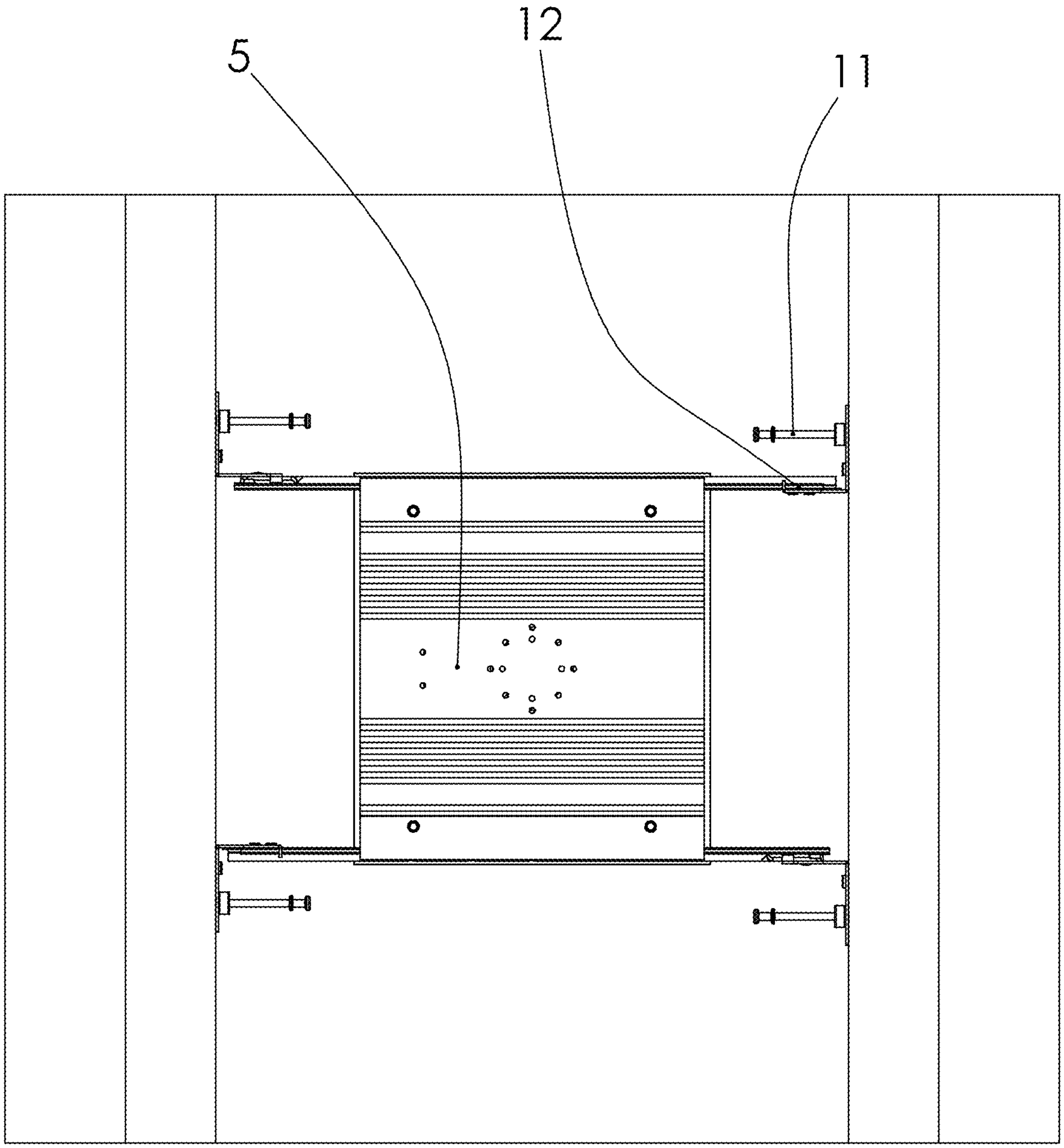
FIG. 7 illustrates a top plan view of the light fixture.

FIG. 7 illustrates a top view of the heat sink 5 attached to the ceiling with bar hanger 12. Heat sink 5 has a plurality of fastener openings on the step which go through the entire step of heat sink 5. A fastener is placed in opening 20 and attached to a complementary opening on bottom of bracket 1. Specifically, the openings on bracket 1 are placed on bottom of the vertical portion that attaches to the bar hangers 2.

Figure 8:
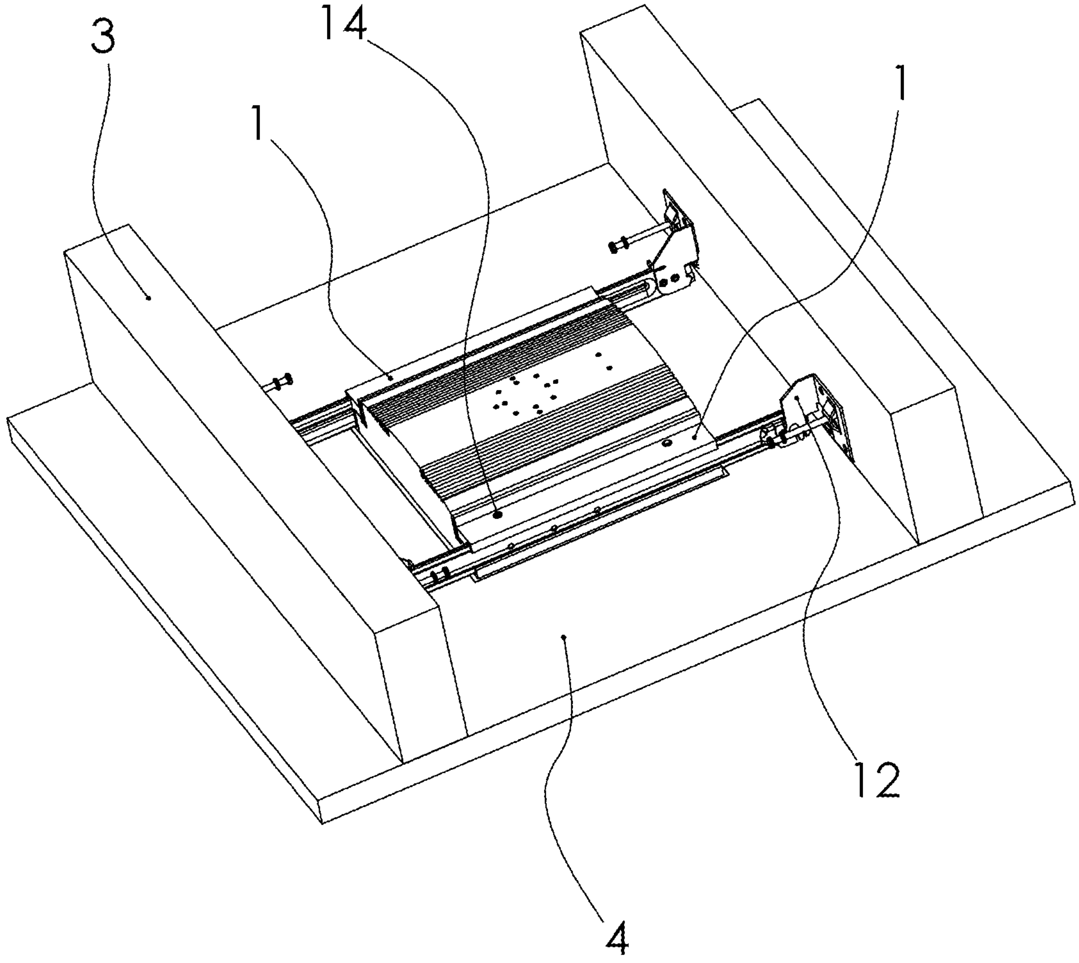
FIG. 8 illustrates a top perspective view of the light fixture.

FIG. 8 illustrates a top perspective view of the heat sink 5 attached to the ceiling with bar hanger 12. Bracket 1 is attached to the bar hanger 12.

Figure 9:
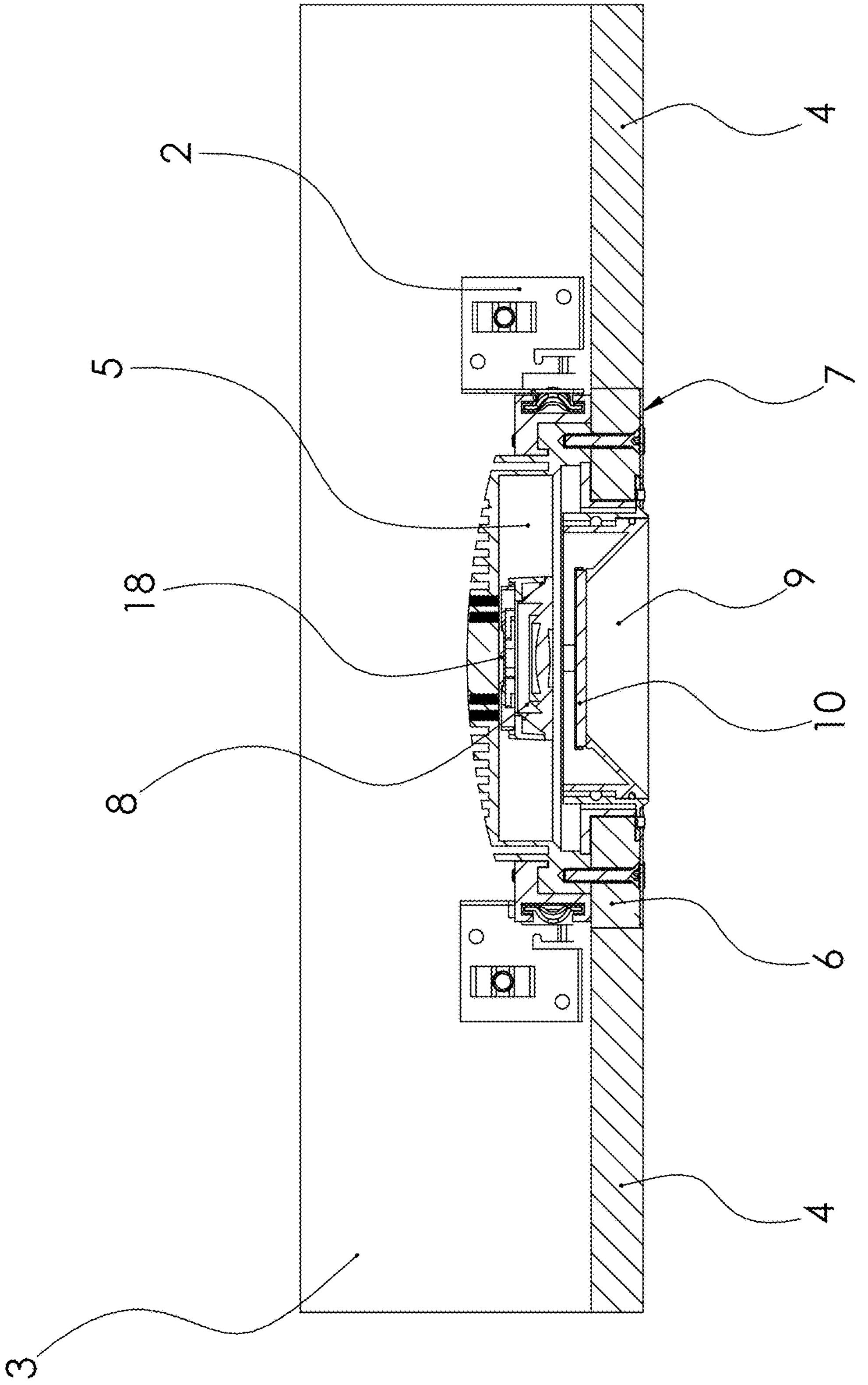
FIG. 9 illustrates a cut-off portion of the light fixture attached to the ceiling.
Figure 10:
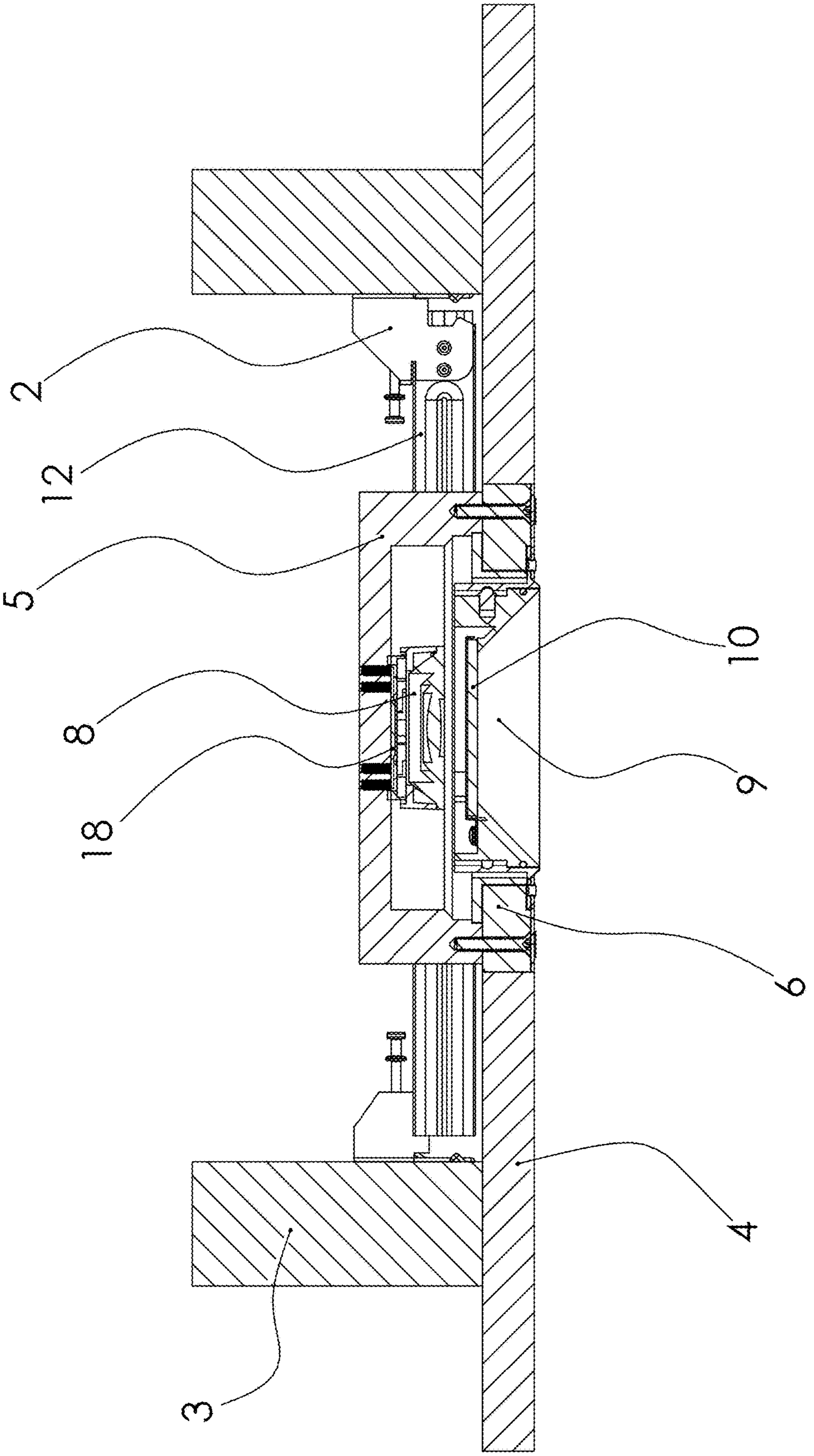
FIG. 10 illustrates a cut-off portion of the light fixture attached to the ceiling.

FIGS. 9 and 10 illustrate a side cut-off portion of the light fixture attached to the ceiling. LED board 18 with LED light sources is attached to bottom of the top of the heat sink 5 inside the cavity. Optics 8 is placed below the LED board 18. Trim 9 and lens 10 are placed below the optics. Trim 9 covers the length of the ceiling tile 4, Also illustrated are secondary Drywall 6 and Mud ring plate 7.

1: Heatsink holder bracket 1
2: Bar hanger
3: Joist 3
4: ceiling tile
5: Heat sink
6: secondary Drywall
7: Mud ring plate
8: Optic 8
9: Trim 9
10: Solite Lens 1
11: Bar hanger nail
12: bar hanger joist bracket
13: Fastener (flat head screw)
14. Opening
16: Aperture Ring Plate (16A plate)
18: LED Board
20. Fastener (flat head screw)

What is claimed is:

1. A Light Fixture comprising:

a) a body with a cavity, the body having an opening on a bottom of the cavity;

b) one or more openings in the body that transverse the body from a bottom of the body to a top of the body;

c) a bracket with one or more openings that are complementary to the one or more openings of the body, the bracket configured to be placed on the top of the openings of the body;

d) one or more fasteners for attaching the body to the bracket, wherein the fastener is configured to be fastened from below the body;

wherein the fastener is the only point of attachment of the body to the bracket, resulting in the body falling downwardly with the removal of the fastener;

further comprising a groove running parallel between the body and the step.

2. The light fixture of claim 1, wherein the body has two steps, with each step placed on opposite sides, wherein a maximum height of the steps at any point is less than a maximum height of the entire body.

3. The light fixture of claim 2, wherein the openings on the body transverse the steps.

4. The light fixture of claim 3, wherein the height of the step is 0.3 to 0.7 relative to the maximum height of the body.

5. The light fixture of claim 1, wherein the bracket has a horizontal portion, and a first vertical portion that forms a channel to receive a T-bar, and a second vertical portion configured to be placed in a groove of the body.

6. The light fixture of claim 1, wherein the bracket has a vertical portion configured to be placed inside of the groove.

7. The light fixture of claim 1, wherein the bracket has a horizontal portion, and at least one vertical portion that forms a channel to receive a T-bar.

8. The light fixture of claim 1, further comprising placing a source of light in the cavity.

9. The light fixture of claim 1, further comprising a one piece fabricated plate with a ring attached below the plate, the plate placed on a bottom of the body, the plate and then ring having an opening that creates an aperture for light leaving the body.

10. The light fixture of claim 9, wherein the plate is configured to receive a drywall around its ring.

11. The light fixture of claim 9, further comprising a mud ring configured to be placed below the drywall.

12. The light fixture of claim 1, further comprising a trim.

13. The light fixture of claim 1, wherein the body is a heat sink made from aluminum and having a plurality of fins on top.

14. A light fixture comprising:

a) a body with a cavity having an opening on a bottom of the cavity, the body having a main portion and steps on opposite sides of the main portion;

b) one or more openings in the body that transverse the body from a bottom of the steps to a top of the steps;

c) two bracket with one or more openings that are complementary to the one or more openings of the steps, the brackets configured to be placed on top of the steps in a manner where both sets of openings align, with one bracket placed on one step;

d) one or more fasteners for attaching the body to the bracket, wherein the one or more fasteners is configured to be fastened from below the body;

wherein the one or more fasteners is the only point of attachment of the body to the bracket, resulting in the body falling downwardly with the removal of the fastener.

15. The light fixture of claim 14, further comprising a groove running parallel between the main part of the body and the steps.

16. The light fixture of claim 15, wherein the bracket has a horizontal portion, and a first vertical portion that forms a channel to receive a T-bar, and a second vertical portion configured to be placed in a groove of the body.

17. The light fixture of claim 15, wherein the horizontal portion of the bracket received the one or more fasteners.

18. The light fixture of claim 14, wherein the body is made from aluminum and has fins on its top, and further comprises a one piece manufactured steel plate with a ring to enclose inside of the body.

19. The light fixture of claim 14, wherein the brackets are configured to be attached to bar hangers.

20. A Light Fixture comprising:

a) a body with a cavity, the body having an opening on a bottom of the cavity;

b) one or more openings in the body that transverse the body from a bottom of the body to a top of the body;

c) a bracket with one or more openings that are complementary to the one or more openings of the body, the bracket configured to be placed on the top of the openings of the body;

d) one or more fasteners for attaching the body to the bracket, wherein the fastener is configured to be fastened from below the body through the one or more openings;

wherein the fastener is the only point of attachment of the body to the bracket, resulting in the body falling downwardly with the removal of the fastener.

* * * * *